June 20, 1944. W. G. WOOD ET AL 2,352,058
AUTOMATIC TEMPERATURE CONTROL
Filed July 31, 1940 3 Sheets-Sheet 1
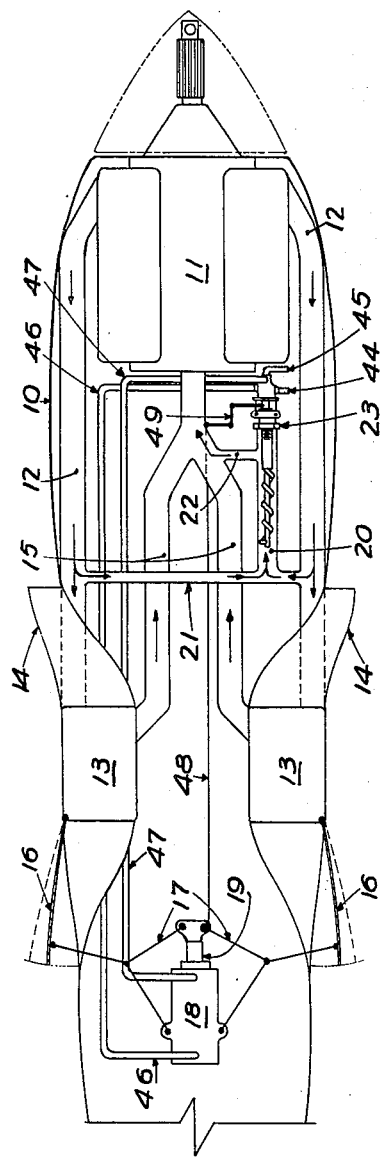
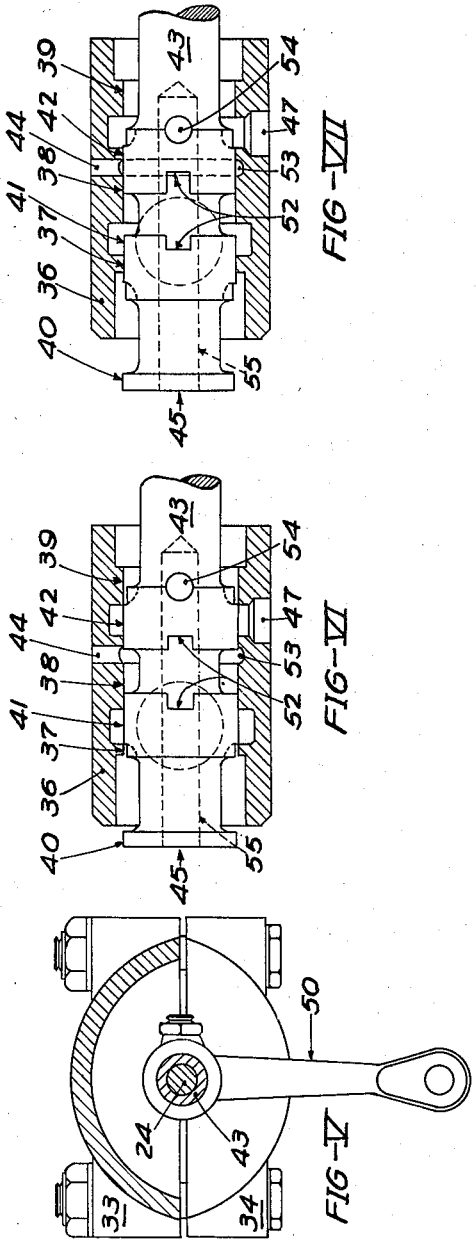
INVENTORS
Wilbur G. Wood
Frank Baldwin Hunt

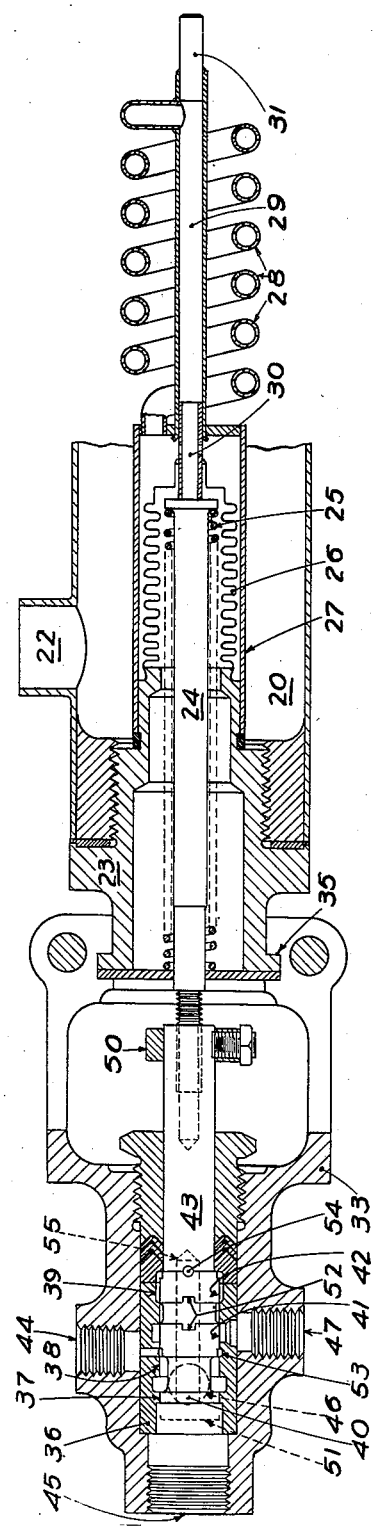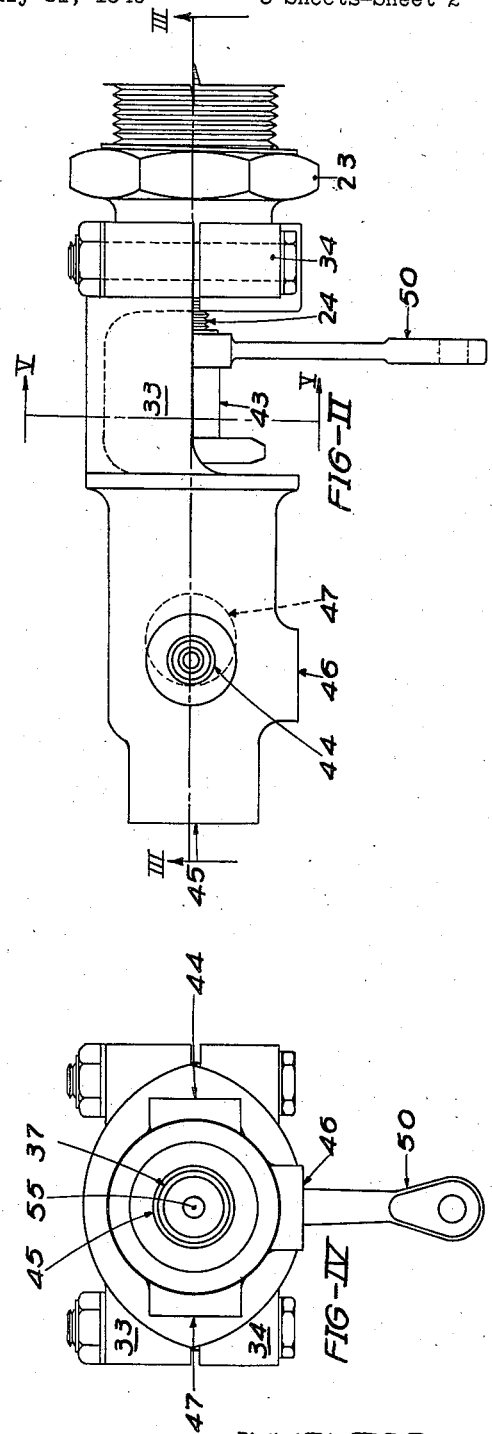

June 20, 1944.   W. G. WOOD ET AL   2,352,058
AUTOMATIC TEMPERATURE CONTROL
Filed July 31, 1940   3 Sheets-Sheet 3
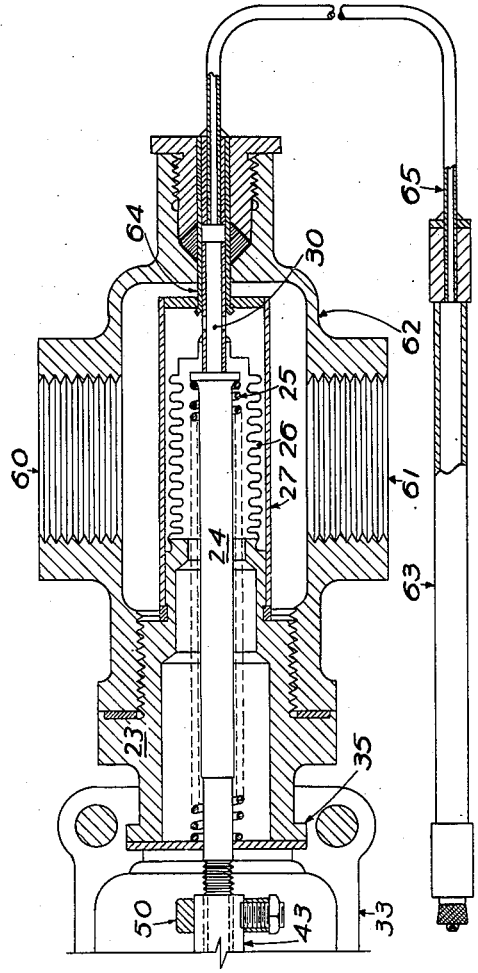
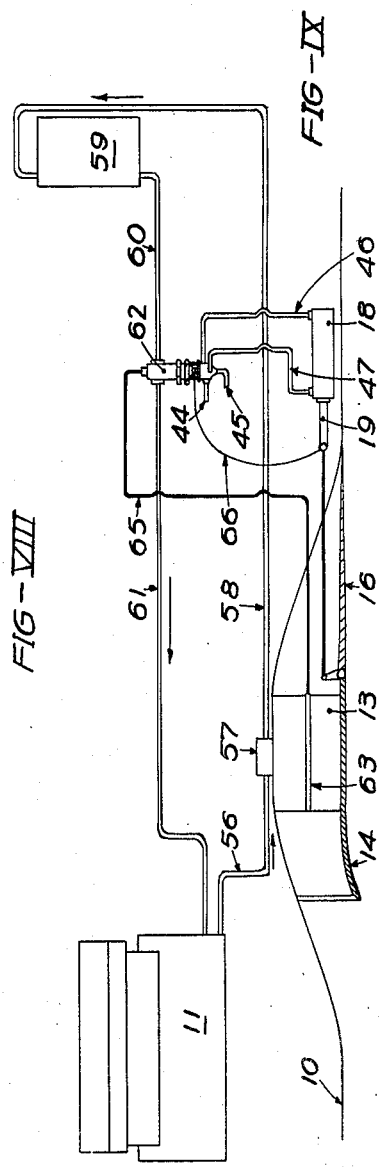
INVENTORS
Wilbur G. Wood
Frank Baldwin Hunter Patented June 20, 1944

2,352,058

UNITED STATES PATENT OFFICE 2,352,058

AUTOMATIC TEMPERATURE CONTROL

Wilbur G. Wood, Glendale, and Frank Baldwin Hunter, Tujunga, Calif., assignors to Lockheed Aircraft Corporation, Burbank, Calif.

Application July 31, 1940, Serial No. 348,634

9 Claims. (Cl. 123—178)

This invention relates to an automatic temperature control for circulating fluids such as the oil and cooling systems of internal combustion engines. In its broader aspects this invention is not limited to engine cooling systems for airplane engines, as it is readily adaptable to control of the cooling or circulation of either a primary fluid, or a secondary fluid used to cool or heat a primary fluid.

It is an object of this invention to provide a servo-motor operated control system of the type described wherein a follow-up mechanism partially restores the servo-motor control towards its neutral position coincident with a change in the setting of the cooling control so that when the optimum operating conditions are reached there will be no over-travel or hunting of the control. This arrangement is especially desirable in an airplane engine cooling or oil circulating system, as the coolant warms up quickly, and the radiator therefor is exposed to increasing cold as the airplane climbs to higher altitudes, so that an opening required near ground level would result in excessive overcooling at higher altitudes.

It is another object of this invention to provide a servo-motor control mechanism responsive to temperatures wherein the temperature responsive element operates a selector valve controlling the flow of an operating fluid; the temperature responsive element and selector valve being so arranged that upon breakdown or failure of the former, the selector valve will be shifted to an emergency position, corresponding to the maximum cooling effect in the case of an internal combustion engine cooling system. Such an arrangement has obvious advantages in a heat control system of the type described, since overcooling would be preferable to overheating.

It is also an object of this invention to provide a control system of the class described wherein the thermostatic element responds to the sum or mean of the temperatures of one side of the fluid circulating system and the radiator temperature; whereby the radiator itself must warm up before the flap will be appreciably opened by the thermostatic control.

It is a further object of this invention to provide an improved and simplified dual heat control system of the class described wherein the temperature responsive element is arranged in a common bypass around the cooling radiators to the cool return lines of the fluid system, whereby the temperature responsive device will be balanced between the dual systems, flow through the bypass being assured by the resistance or back pressure produced by the radiators.

Other and further important objects of this invention will be apparent from the disclosures in the specification and the accompanying drawings.

This invention in its preferred form is illustrated in the drawings and hereinafter more fully described.

In the drawings:

Figure I is a diagrammatic layout of a liquid cooled aircraft engine installation embodying one form of the invention.

Figure II is a fragmentary side elevation of the selector valve body, the thermostatic member being omitted.

Figure III is a longitudinal section on the line III—III of Figure II showing the complete control mechanism.

Figure IV is an end view of the selector valve.

Figure V is a section on the line V—V of Figure II, showing the take-up lever which restores the selector valve to neutral.

Figure VI is an enlarged sectional view of the selector valve in a position corresponding to normal operating temperature.

Figure VII is a view similar to Figure VI showing the selector valve in its extreme position for maximum temperature.

Figure VIII is a diagrammatic sectional showing of an oil cooling system also embodying a modification of the thermostatic control.

Figure IX is an enlarged fragmentary longitudinal section through the dual thermostatic elements of Figure VIII.

As shown:

An installation of an engine cooling system for an ethyl glycol cooled airplane engine has been chosen for illustrative purposes, as shown in Figures I to VII inclusive; comprising an engine nacelle 10 containing a V type liquid cooled engine 11 each cylinder bank of which has separate coolant discharge pipes 12 leading to duplicate coolant radiators 13 in openings on opposite sides of the nacelle, each radiator having an air scoop 14. Coolant return pipes 15 lead back to the engine 11. Coolant circulation is maintained by standard pumping means (not shown) incorporated in the engine.

The flow of air through the radiators may be controlled in a number of ways, as by entrance or exit louvres or flaps. As shown, exit flaps 16 are hinged adjacent their forward edges and may be moved from full closed to full open by means of toggle linkage 17 operated by a double acting hydraulic cylinder 18 and piston 19, which acts to partially straighten out the toggle to close the flaps.

Pressure fluid is usually available from a number of sources, including the engine oil circulating system, manifold vacuum, the cooling system itself, etc. In airplanes, high pressure fluid is available from an accessory pump driven by the engine, as various controls are usually operated thereby, such as retractable landing gears. For this reason, no particular source of pressure fluid has been disclosed herein.

The control mechanism, supplying pressure fluid to operate the hydraulic piston 19, is mounted in a chamber 20 which has a circulation of coolant therethrough by means of a connection to a small bypass 21 connecting the coolant discharge pipes 12. The bypass supplies hot coolant from both pipes 12 to the chamber 20, from which the coolant flows to the return pipe 15 through a connection 22, the resistance in the radiators providing sufficient pressure differential to assure a positive flow of coolant through the bypass to the chamber 20.

A thermostatically responsive element is inserted in the chamber 20 to be submerged in the coolant therein; this element comprising a bushing 23 screwed into and sealing the open end of the chamber 20. A rod 24 is reciprocable in the bushing and is urged to the right in Figure III by a spring 25, the purpose of which is to open the radiator flaps upon failure of the thermostatic element. The right hand end of the rod is enclosed by a flexible corrugated bellows 26 sealed to the rod 24 and bushing 23 at either end thereof. A shell 27 encloses the bellows 26 and is filled with a suitable thermostatically responsive liquid, the expansion of which, in response to increasing temperatures, forces the rod 24 to the left in Figure III. In order to increase the rapidity of response to temperature changes, a spiral tube 28 forms an extension of the tube 27 and has a central return tube 29 through a ported telescoping sleeve 30 carried by the rod 24. A plug 31 in the right end of the return tube 29 serves for filling with the thermostatic fluid.

A selector valve body 33 has a split cap 34 for clamping the body in place on a flange 35 on the exposed end of the bushing 23, the body 33 being aligned with the rod 24. The body 33 is counterbored for a sleeve 36 containing internal lands 37, 38 and 39 which sealingly coact with lands 40, 41 and 42 on a valve stem 43 which is threadingly engaged on the rod 24 and angularly movable relative thereto. The body 33 has fluid connections comprising a pressure inlet 44 for the working fluid, a return line 45 therefor, a connection 46 to the flap opening side of the hydraulic cylinder 18, shown dotted in Figures III, VI and VII: and a connection 47 to the closing side of the hydraulic cylinder.

Movement of the flaps 16 is caused to rotate the valve stem 43 by means of a connecting link 48, bell crank 49 and lever 50 which latter serves to shift slightly the valve stem in a direction opposite to the motion of the thermostat rod 24. In other words, if the thermostat rod 24 shifts the valve stem to the left to open the flaps 16, the opening movement of the hydraulic piston moves the lever 50 to shift slightly the valve stem 43 to shut off the flow of operating fluid. This arrangement prevents hunting, since if the initial opening movement is sufficient, the control is stable, while if the temperature continues to increase, a further opening movement of the flaps will result until conditions stabilize. The same precedure, in reverse, results from falling temperatures. It is to be noted that the relative movement resulting from the follow-up control is slight compared to the movement of the thermostat rod 24. Also, the optimum operating temperature for ethylene glycol as a coolant is in the neighborhood of 240° F., and such a stable temperature may be reached at widely varying flap positions, as the control can stabilize at any point.

The operating fluid flow, past the several sleeve and valve lands, is so arranged that at both extremes of valve motion the flaps will be opened wide. The position shown in Figure III corresponds to an emergency such as leakage of the thermostatic liquid, allowing the spring 25 to shift the rod 24 to the extreme right. It would require a temperature of approximately 100° F. below zero to shift to this position by normal contraction of the thermostat liquid. The dotted line 51 in Figure III corresponds to the position of the valve for plus 50° F., which involves a reversal of the flap position to fully closed.

Figure VI shows the valve positioned for stable optimum conditions, in the illustrated case a temperature of approximately 240° F. Under these conditions the sleeve land 38 blocks both the lands 41 and 42 on the valve 43. It is to be noted that the initial fluid openings are provided by notches 52 in the lands on the valve.

In Figure VII the valve position corresponds to a temperature of 350° F., which shifts the valve to its extreme left position, pressure fluid from the source of supply entering a groove 53 in the sleeve land 38 to the space on the valve stem between the lands 41 and 42 thereon, thence out the connection 46 to the opening side of the hydraulic cylinder 18. A corresponding return flow from the other end of the cylinder 18 enters the sleeve 36 through the connection 47 to the right of the valve land 42 and flows through drilled holes 54 to a central passage 55 discharging through the left end of the valve to the fluid return connection 45. In Figure III the flaps are opened by fluid flow from 44 to the left of land 41 on the valve and thence to the connection 46, returns flow being from 47 to between valve lands 41 and 42 thence to the right past land 42 to the drilled holes 54.

While we have chosen to illustrate our invention by an aircraft engine coolant installation; it is to be understood that our invention can be used in an oil circulating system, as shown in Figures VIII and IX; or for other cooling or heating controls; and that the invention is equally applicable to fields of use other than with internal combustion engines.

In describing the operation of the illustrated form of the invention several references were made to specific temperatures. It will be understood that these references are to coolant temperatures when ethyl glycol is used; water or other liquids requiring other temperature ranges. It will be evident that the thermostat could be equally well proportioned to operate on the cool or return side of the circulating system, in which case the operating temperatures would be correspondingly lower. Since the thermostatic element is submerged in the coolant, it is not affected by outside air temperatures. However, the follow up system produces a small change in the temperature adjustment of the control system with changes in outside air temperatures, depending upon the flap opening necessary to maintain optimum cooling, since a small opening at low air temperatures will cool as well as a wide opening at high air temperatures, and the difference in the flap setting varies the angular position of the lever 50 and hence the spacing of the valve stem 43 relative to the rod 24. For this reason the motion produced by the follow-up system should be kept to the lowest value that will successfully control hunting, if the temperature control is desired to be held to close limits over the full range of conditions met in service.

In Figures VIII and IX we have shown modifications directed to an oil cooling system, and another type of multiple thermostatic liquid container; the showings having many features in common with the coolant temperature control previously described; to which the same reference numerals have been applied. In Figure IX oil is circulated through a pipe 56 from the engine 11 to a viscosity valve 57 associated with the cooling radiator 13, the viscosity valve serving to bypass the radiator when the oil congeals therein. From the viscosity valve a pipe 58 discharges the oil into a tank 59 from which the engine draws its oil supply through pipes 60 and 61 to and from a thermostat valve body 62 corresponding to the previously described chamber 20.

The thermostat and selector valve in Figure IX have had the same reference numerals applied as hereinbefore described, the only alteration being the substitution of a second thermostatic fluid chamber 63 for the spiral tubes 28 and 29. This chamber 63 is intended to be inserted in one of the passages in the radiator 13 to respond to temperatures therein, and is connected to a central tube 64 in the end of the shell 27 by a capillary tube 65. Instead of using linkage 48 and a bell crank 49, a Bowden wire 66 connects the follow up lever 50 to the end of the hydraulic piston 19, it being evident that either arrangement is satisfactory for both disclosures herein.

The dual or compound thermostatic liquid containers formed by the shell 27 and chamber 63 react to the sum or mean of the temperatures in the return line and in the radiator, reacting as one bulb on the rod 24 operating the selector valve. With this arrangement the control as a whole reaches its optimum or stable operating temperature only when the proper temperature distribution has registered on both members. If low temperatures have congealed the oil in the radiator the chamber 63 will provide expansion space for thermostatic fluid heated in the shell 27, so that the thermostat will not operate to open the radiator flap 16 until the oil therein has warmed up. The two fluid chambers 27 and 63 may be balanced against each other in various proportions as desired. If evenly balanced it will be evident that the operating temperature will be the mean of the oil return and radiator temperatures.

It will thus be seen that we have invented an improved and simplified automatic temperature control system adapted for cooling or heating circulating systems in general, and internal combustion engines in particular.

Having thus described our invention and the present preferred embodiments thereof, we desire to emphasize the fact that many modifications may be resorted to in a manner limited only by a just interpretation of the following claims.

We claim:

1. An engine cooling system embodying at least two fluid circulating systems, a cooling radiator for each system, a bypass connecting said circulating systems to the return sides of the radiators, a thermostat submerged in said bypass, air circulation restricting means for each radiator, hydraulic operating means for said restricting means, and a selector valve associated with the thermostat and adapted to control said hydraulic operating means.

2. An engine cooling system embodying at least two fluid circulating systems, a cooling radiator for each system, a bypass connecting said circulating systems to the return sides of the radiators, a thermostat submerged in said bypass, air circulation restricting means for each radiator, hydraulic operating means for said restricting means, a selector valve associated with the thermostat and adapted to control said hydraulic operating means, and follow-up means connected between the circulation restricting means and the thermostatic member adapted to vary the energization of the operating means in accordance with the position of the circulation restricting means.

3. An engine cooling system embodying at least two fluid circulating systems, a cooling radiator for each system, a bypass connecting said circulating systems to the return sides of the radiators, a thermostat submerged in said bypass, air circulation restricting means for each radiator, hydraulic operating means for said restricting means, a selector valve associated with the thermostat and adapted to control said hydraulic operating means, and emergency means for releasing said circulation restricting means upon failure of said thermostatic member.

4. An engine fluid cooling system embodying at least two fluid circulating systems, each including a radiator for cooling the fluid in its circulating system, a bypass connecting the hot sides of each system to the return sides thereof, a thermostat submerged in said bypass, air circulation restricting means for each radiator, powered operating means for said restricting means, and selector means associated with the thermostat and adapted to control said powered operating means.

5. An engine fluid cooling system embodying at least two fluid circulating systems, each including a radiator for separately cooling the fluid in its circulating system, a common bypass connecting the hot sides of each system to the return sides thereof, a thermostat submerged in said bypass, air circulation restricting means for each radiator, a common operating means for said restricting means, and selector means associated with the thermostat and adapted to control said common operating means.

6. In a fluid cooling system of the class described, a fluid cooling radiator, means to circulate fluid from the heat source and return, a first temperature responsive element subject to the temperature of the circulating fluid intermediate the outlet and inlet of said heat source, means for varying the heat exchange between fluid in said radiator and the cooling air passing therethrough, means directly responsive to the effect of said first temperature responsive element for actuating said heat exchange varying means, and a second temperature responsive element connected with said first temperature responsive element and subject to the temperature of only the fluid contained within the heat exchanging portion of said radiator intermediate its inlet and outlet said second temperature responsive element being provided to modify the action of said first temperature responsive element upon overcooling or congealing of the fluid in said radiator, whereby to facilitate the warming up of the radiator and the fluid therein by delaying the response of said means for varying the heat exchange between the fluid and the cooling air.

7. In a fluid circulating system according to claim 6, a bypass across the radiator in said system adapted to maintain the fluid circulation upon congealing of the fluid in the radiator.

8. In a fluid cooling system of the class described, a fluid cooling radiator, means to circulate fluid from the heat source through the radiator and return, a first temperature responsive element subject to a temperature of the circulating fluid intermediate the outlet and inlet of the said heat source, a second temperature responsive element located intermediate the inlet and outlet of the heat exchanging portion of said radiator, means for varying the heat exchange between fluid in said radiator and the cooling air passing therethrough, and means responsive to the combined effects of said first and second temperature responsive elements for actuating the said means for varying the radiator heat exchange whereby overcooling in the radiator modifies the response of said last mentioned means to normal operating temperatures at the first temperature responsive element.

9. In a fluid cooling system according to claim 8 with a bypass around the radiator whereby fluid circulation from the said heat source may be maintained whether or not fluid flow through the said radiator is maintained.

WILBUR G. WOOD.
FRANK BALDWIN HUNTER.